(12) United States Patent
Kim

(10) Patent No.: US 11,398,223 B2
(45) Date of Patent: Jul. 26, 2022

(54) ELECTRONIC DEVICE FOR MODULATING USER VOICE USING ARTIFICIAL INTELLIGENCE MODEL AND CONTROL METHOD THEREOF

(71) Applicant: Samsung Electronics Co., Ltd., Suwon-si (KR)

(72) Inventor: Saeyoung Kim, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/979,344

(22) PCT Filed: Mar. 20, 2019

(86) PCT No.: PCT/KR2019/003233
§ 371 (c)(1),
(2) Date: Sep. 9, 2020

(87) PCT Pub. No.: WO2019/182346
PCT Pub. Date: Sep. 26, 2019

(65) Prior Publication Data
US 2021/0005180 A1 Jan. 7, 2021

(30) Foreign Application Priority Data
Mar. 22, 2018 (KR) .......... 10-2018-0033199

(51) Int. Cl.
*G10L 15/06* (2013.01)
*G10L 13/033* (2013.01)

(52) U.S. Cl.
CPC .......... *G10L 15/063* (2013.01); *G10L 13/033* (2013.01)

(58) Field of Classification Search
None
See application file for complete search history.

(56) References Cited

U.S. PATENT DOCUMENTS 7,571,099 B2 8/2009 Saito et al.
9,262,410 B2 2/2016 Sakamoto et al.
(Continued)

FOREIGN PATENT DOCUMENTS

JP 3895758 B2 3/2007
JP 5750380 B2 7/2015
(Continued)

OTHER PUBLICATIONS

Gao et al., Voice Impersonation Using Generative Adversarial Networks, Feb. 19, 2018.
(Continued)

*Primary Examiner* — Jakieda R Jackson
(74) *Attorney, Agent, or Firm* — Jefferson IP Law, LLP

(57) ABSTRACT

The present disclosure relates to an artificial intelligence (AI) system utilizing a machine learning algorithm such as deep learning, etc. and an application thereof. In particular, a controlling method of an electronic apparatus includes obtaining a user voice of a first user, converting the voice of the first user into a first spectrogram, obtaining a second spectrogram by inputting the first spectrogram to a trained model through an artificial intelligence algorithm, converting the second spectrogram into a voice of a second user, and outputting the converted second user voice. Here, the trained model is a model trained to obtain a spectrogram of a style of the second user voice by inputting a spectrogram of a style of the first user voice. In particular, at least part of the controlling method of the electronic apparatus uses an artificial intelligence model trained according to at least one of machine learning, a neural network or a deep learning algorithm.

9 Claims, 11 Drawing Sheets

(56) References Cited

U.S. PATENT DOCUMENTS

| | | | |
|---|---|---|---|
| 10,068,557 B1* | 9/2018 | Engel | G10H 7/10 |
| 10,872,598 B2* | 12/2020 | Arik | G06N 3/0454 |
| 2005/0212930 A1* | 9/2005 | Sim | H04N 19/60 |
| | | | 348/231.4 |
| 2007/0055527 A1 | 3/2007 | Jeong et al. | |
| 2016/0284346 A1 | 9/2016 | Visser et al. | |
| 2016/0379623 A1 | 12/2016 | Luan et al. | |
| 2017/0148433 A1 | 5/2017 | Catanzaro et al. | |
| 2017/0330586 A1 | 11/2017 | Roblek et al. | |
| 2018/0350348 A1* | 12/2018 | Fukuda | G10L 21/003 |

FOREIGN PATENT DOCUMENTS

| | | |
|---|---|---|
| KR | 0173340 B1 | 4/1999 |
| KR | 10-2007-0028764 A | 3/2007 |
| KR | 10-2017-0107683 A | 9/2017 |

OTHER PUBLICATIONS

Wang et al., TacoTron: Towards End-to-End Speech Synthesis, Apr. 6, 2017.

Foote et al., Do Androids Dream of Electric Beats?, https://audiostyletransfer.wordpress.com/, Dec. 14, 2016.

Ulyanov, Audio Texture Synthesis and Style Transfer, https://dmitryulyanov.github.io/audio-texture-synthesis-and-style-transfer/, Dec. 13, 2016.

Huzaifah, "Comparison of Time-Frequency Representations for Environmental Sound Classification using Convolutional Neural Networks" arXiv:1706.07156v1, [cs.CV], Jun. 22, 2017.

Li et al. "A Deep Generative Model for Disentangled Representations of Sequential Data" arXiv:1803.02991v1, [cv.LG], Mar. 8, 2018.

Yuan et al. "Auxiliary Loss Multimodal GRU Model in Audio-Visual Speech Recognition" IEEE Access, date of publication Feb. 2, 2018.

Korean Office Action dated May 30, 2022, issued in Korean Application No. 10-2018-0033199.

* cited by examiner

ELECTRONIC DEVICE FOR MODULATING USER VOICE USING ARTIFICIAL INTELLIGENCE MODEL AND CONTROL METHOD THEREOF

TECHNICAL FIELD

This disclosure relates to an electronic apparatus and a controlling method thereof and more particularly, to an electronic apparatus for modulating a user voice to another user voice using an artificial intelligence model and a controlling method thereof.

BACKGROUND ART

Recently, an artificial intelligence system that realizes human-level intelligence has been used in various fields. Unlike the existing rule-based smart system, the artificial intelligence system is a system in which a machine learns, judges and becomes smart by itself. As the artificial intelligence system is used, the recognition rate is improved and the user's preference can be understood more accurately, and the existing rule-based smart system is gradually being replaced with a deep learning-based artificial intelligence system.

Artificial intelligence technology includes machine learning and element technologies that utilize the machine learning.

The machine learning is an algorithm technology of classifying and learning features of input data by oneself, and the element technology is a technology of using an algorithm related to machine learning such as deep learning and includes technical fields such as linguistic understanding, visual understanding, inference/prediction, knowledge representation, a motion control, and the like.

The artificial intelligence technology is applied are as follows. The linguistic understanding is a technology of recognizing and applying/processing human languages/characters, and includes natural language processing, machine translation, a dialog system, question and answer, speech recognition/synthesis, and the like. The visual understanding is a technology of recognizing and processing things like human vision, and includes object recognition, object tracking, image search, human recognition, scene understanding, space understanding, image improvement, and the like. The inference/prediction is a technology of determining and logically inferring and predicting information, and includes knowledge/probability-based inference, optimization prediction, preference-based planning, recommendation, and the like. The knowledge representation is a technology of automating and processing human experience information as knowledge data, and includes knowledge establishment (data generation/classification), knowledge management (data utilization), and the like. The motion control is a technology of controlling autonomous driving of a vehicle, a motion of a robot, and the like, and includes a motion control (navigation, collision, driving), an operation control (behavior control), and the like.

Meanwhile, the voice provided by the electronic apparatus in the related art has a mechanical and artificial feeling, and there is a limitation that it is difficult to provide a friendly image to a user. In particular, recently, when providing an artificial intelligence assistant service, a case where a feedback is provided using a voice has increased, but such a feedback using a voice is also a uniform machine voice.

Accordingly, there is an increasing need to provide a feedback using a voice that is more familiar to a user.

DETAILED DESCRIPTION OF INVENTION

Technical Problem

The present disclosure relates to an electronic apparatus capable of modulating a user voice to another user voice by changing a spectrogram corresponding to the user voice to a spectrogram corresponding to another user voice using an artificial intelligence model and a controlling method thereof.

Technical Solution

A controlling method of an electronic apparatus according to an embodiment includes obtaining a user voice of a first user, converting the voice of the first user into a first spectrogram, obtaining a second spectrogram by inputting the first spectrogram to a trained model through an artificial intelligence algorithm, converting the second spectrogram into a voice of a second user, and outputting the converted second user voice, and the trained model is a model trained to obtain a spectrogram of a style of the second user voice by inputting a spectrogram of a style of the first user voice.

The converting to the first spectrogram may include converting the first user voice into the first spectrogram using discrete wavelet transform (DWT), and the converting to the second user voice may include converting the second spectrogram into the second user voice using a Griffi-Lim algorithm.

Data input to the trained model may include an input value corresponding to a frequency from the first spectrogram and the number of channels corresponding to a time from the first spectrogram.

The trained model may be a Variational Auto-encoder (VAE) model, and the VAE model may include an encoder network for obtaining a latent variable from the first spectrogram and a decoder network for obtaining the second spectrogram corresponding to the second user voice from the obtained latent variable.

The trained model may be a Generative Adversarial Networks (GAN) model, and the GAN model may be trained using a generator for obtaining the second spectrogram corresponding to the second user voice from the first spectrogram and a discriminator for determining whether the second spectrogram corresponding to the second user voice is a real image.

The trained model may be plural, and each of the plurality of trained models may be trained to obtain an image of a corresponding user voice style.

An electronic apparatus according to an embodiment includes a microphone, an output unit, a memory including at least one command, and a processor configured to be connected to the output unit and the memory and control the electronic apparatus, and the processor is configured to obtain a user voice of a first user through the microphone by executing the at least one command, convert the first user voice into a first spectrogram, obtain a second spectrogram by inputting the first spectrogram into a model trained through an artificial intelligence algorithm, convert the second spectrogram into a user of a second user, and control the output unit to output the converted second user voice, and the trained model is a model trained to obtain a spectrogram of a style of the second user voice by inputting a style of the first user.

The processor may be configured to convert the first user voice into the first spectrogram using discrete wavelet transform (DWT), and convert the second spectrogram into the second user voice using a Griffi-Lim algorithm.

Data input to the trained model may include an input value corresponding to a frequency from the first spectrogram and the number of channels corresponding to a time from the first spectrogram.

The trained model may be a Variational Auto-encoder (VAE) model, and the VAE model may include an encoder network for obtaining a latent variable from the first spectrogram and a decoder network for obtaining the second spectrogram corresponding to the second user voice from the obtained latent variable.

The trained model may be a Generative Adversarial Networks (GAN) model, the GAN model may be trained using a generator for obtaining the second spectrogram corresponding to the second user voice from the first spectrogram and a discriminator for determining whether the second spectrogram corresponding to the second user voice is a real image.

The trained model may be plural, and each of the plurality of trained models may be trained to obtain an image of a corresponding user voice style.

Effect of Invention

As the above-described various embodiments of the present disclosure, a user may be provided with various user environments as a user voice is converted to voices in various styles.

DETAILED DESCRIPTION OF EXEMPLARY EMBODIMENTS

Figure 1:
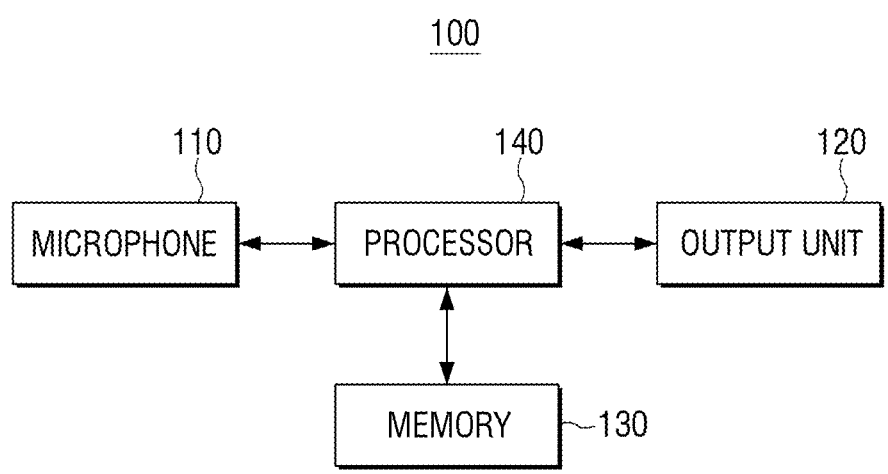
FIG. 1 is a block diagram illustrating configuration of an electronic apparatus schematically according to an embodiment.

Hereinafter, diverse embodiments of the disclosure will be described with reference to the accompanying drawings.

It should be understood that it is not intended to limit the technology described in the disclosure to specific embodiments, but include various modifications, equivalents, and/or replacements of the embodiments. Throughout the accompanying drawings, similar components will be denoted by similar reference numerals.

In the disclosure, terms such as "have," "may have," "include" and "may include" should be construed as denoting that there are such characteristics (e.g.: elements such as numerical values, functions, operations and components), and the terms are not intended to exclude the existence of additional characteristics.

Also, in the disclosure, the expressions "A and/or B," "at least one of A and/or B," or "one or more of A and/or B" and the like may include all possible combinations of the listed items. For example, "A or B," "at least one of A and B" or "at least one of A or B" refer to all of the following cases: (1) including at least one A, (2) including at least one B or (3) including at least one A and at least one B.

In addition, the expressions "first", "second", or the like may indicate the corresponding components regardless of a sequence or importance of the components, will be used only in order to distinguish one component from the other components, and do not limit the corresponding components.

When it is mentioned that any component (e.g., a first component) is "(functionally or communicatively) coupled with/to" or "connected to" to another component (e.g., a second component), any component may be directly connected to another component or may be connected to another component through the other component (e.g., a third component). On the other hand, when it is mentioned that any component (e.g., a first component) is "directly coupled with/to" or "directly connected to" to another component (e.g., a second component), it can be understood that there is no other component (e.g., a third component) between the above components.

The expression "configured (or set) to" used in the disclosure may be interchangeably used with, for example, an expression "suitable for", "having the capacity to", "designed to", "adapted to", "made to", or "capable of" Meanwhile, the term "configured to" does not necessarily mean that a device is "specifically designed to" in terms of hardware. Instead, under some circumstances, the expression "a device configured to" may mean that the device "is capable of" performing an operation together with another device or component. For example, the phrase "a processor configured to perform A, B and C" may mean a dedicated processor (e.g.: an embedded processor) for performing the corresponding operations, or a generic-purpose processor (e.g.: a CPU or an application processor) that can perform the corresponding operations by executing one or more software programs stored in a memory device.

An electronic device according to the various embodiments of the disclosure may include at least one of, for example, a smartphone, a tablet PC, a mobile phone, a video phone, an e-book reader, a desktop PC, a laptop PC, a netbook computer, a workstation, a server, a PDA, a portable multimedia player (PMP), an MP3 player, a medical device, a camera, or a wearable device. Also, the wearable device may include at least one of an accessory-type device (e.g.: a watch, a ring, a bracelet, an ankle bracelet, a necklace, glasses, a contact lens, or a head-mounted-device (HMD)), a device integrated with fabrics or clothing (e.g.: electronic clothing), a body-attached device (e.g.: a skin pad or a tattoo), or an implantable circuit. In addition, in some embodiments, an electronic device according to various embodiments of the disclosure may include at least one of, for example, a television, a digital video disk (DVD) player, an audio, a refrigerator, an air conditioner, a cleaner, an oven, a microwave oven, a washing machine, an air cleaner, a set top box, a home automation control panel, a security control panel, a media box (e.g.: Samsung HomeSync™, Apple TV™, or Google TV™), a game console (e.g.: Xbox™, PlayStation™), an electronic dictionary, an electronic key, a camcorder, or an electronic photo frame.

Also, in another embodiment of the disclosure, an electronic device may include at least one of various types of medical devicews (e.g.: various types of portable medical measurement instruments (a blood glucose meter, a heart rate meter, a blood pressure meter, or a thermometer, etc.), magnetic resonance angiography (MRA), magnetic resonance imaging (MRI), computed tomography (CT), a photographing device, or an ultrasonic instrument, etc.), a navigation device, a global navigation satellite system (GNSS), an event data recorder (EDR), a flight data recorder (FDR), a vehicle infotainment device, an electronic device for vessels (e.g., a navigation device for vessels, a gyrocompass, etc.), avionics, a security device, a head unit for a vehicle, an industrial or a household robot, a drone, an ATM of a financial institution, a point of sales (POS) of a store, or an Internet of things (IoT) device (e.g.: a light bulb, various types of sensors, a sprinkler device, a fire alarm, a thermostat, a street light, a toaster, exercise equipment, a hot water tank, a heater, a boiler, etc.).

In this disclosure, the term 'a user' may refer to a person using an electronic apparatus or a device using an electronic apparatus (e.g.: an artificial intelligence electronic apparatus).

Hereinafter, the present disclosure will be described in greater detail with reference to the accompanying drawings. FIG. 1 is a block diagram illustrating configuration of an electronic apparatus schematically according to an embodiment. As illustrated in FIG. 1, an electronic apparatus 100 may include a microphone 100, an output unit 120, a memory 130, and a processor 140. Meanwhile, the components illustrated in FIG. 1 are exemplary diagrams for implementing embodiments of the present disclosure, and appropriate hardware/software components that are apparent to those skilled in the art may be further added in the electronic apparatus 100.

In this case, the microphone 110 may receive a user voice. Here, the microphone 110 may be provided inside the electronic apparatus 100, but this is only an example. The microphone 110 may be electrically connected to the electronic apparatus 100.

The output unit 120 may output various audio feedbacks. In particular, the output unit 120 may output a second user voice which is converted by the processor 140. In this case, the output unit 120 may be implemented as a speaker, but this is only an example. The output unit 120 may be implemented as a different component (e.g., an output terminal).

The memory 130 may store commands or data related to at least one another component of the electronic apparatus 100. In particular, the memory 130 can be implemented as a non-volatile memory, a volatile memory, a flash-memory, a hard disc drive (HDD), a solid state drive (SSD), and the like. The memory 130 can be accessed by the processor 140, and reading/recording/correction/deletion, etc. of data by the processor 140 may be performed. In this disclosure, the term 'a memory' may include the memory 130, a ROM (not shown) inside the processor 140, or a memory card (not shown) (e.g., a micro SD card, a memory stick) mounted on a RAM (not illustrated) or the electronic apparatus 100. In addition, the memory 130 may store programs, data, etc. for configuring various screens to be displayed on a display area.

In particular, the memory 130 may store a program for performing an artificial intelligence agent. In this case, the artificial intelligence agent is a personalized program for providing various services to the electronic apparatus 100.

Figure 3:
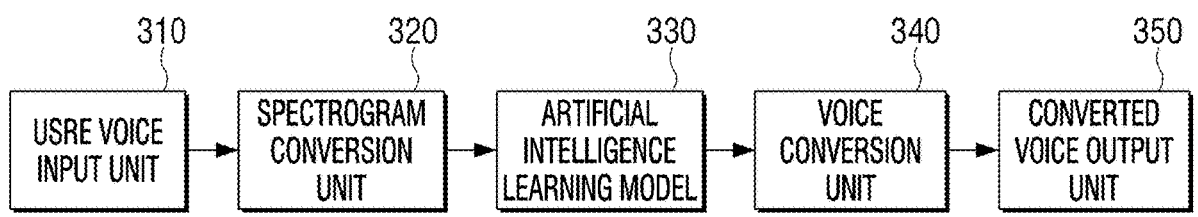
FIG. 3 is a block diagram illustrating configuration for modulating a user voice according to an embodiment.

In addition, as illustrated in FIG. 3, the memory 130 may include various configurations for modulating a user voice to another user voice. In this case, the memory 130 may store a plurality of trained models for modulating a user voice to another user voice, and each of the trained models may correspond to each of a plurality of other user voices, respectively, which will be described in detail later with reference to FIGS. 3 to 5B.

The processor 140 may be electrically connected to the microphone 110, the output unit 120 and the memory 130, and control the overall operations and functions of the electronic apparatus 100. In particular, the processor 140 may execute at least one command stored in the memory 130 to obtain a user voice of a first user through the microphone 110, convert the voice of the first user to a first spectrogram, input the first spectrogram to a trained model through an artificial intelligence algorithm to obtain a second spectrogram, convert the second spectrogram to a voice of a second user, and output the output unit 120 to output the converted voice of the second user.

Specifically, when the voice of the first user is received through the microphone 110, the processor 130 may convert the voice of the first user to the first spectrogram using discrete wavelet transform (DWT).

Subsequently, the processor 140 may obtain the second spectrogram by inputting the converted first spectrogram to a trained artificial intelligence model. In this case, the trained model may be a Variational Auto-encoder (VAE) model or a Generative Adversarial Networks (GAN) model, but they are only examples. The trained model may be implemented as another artificial intelligence model. In particular, the trained model may be a model trained to obtain the spectrogram of the second user voice style by inputting the spectrogram of the first user voice style.

The processor 140 may convert the obtained second spectrogram into a voice of the second user using a Griffin-Lim algorithm.

In addition, the processor 140 may control the output unit 120 to output the converted voice of the second user.

Meanwhile, according to the various embodiments of the present disclosure, the electronic apparatus 100 may obtain a spectrogram corresponding to the second user voice using a spectrogram corresponding to the first user voice as input data. Specifically, the electronic apparatus 100 may obtain an image corresponding to the second user voice by inputting a spectrogram corresponding to the first user voice to an artificial intelligence model trained to generate (or convert) a spectrogram corresponding to the second user voice.

In the present disclosure, the trained artificial intelligence model may be established in consideration of an application field of a recognition model or computer performance of a device. The trained artificial intelligence model may be, for example, a model based on a neural network. The recognition model may be designed to simulate a human brain structure on a computer and may include a plurality of network nodes having weights, which simulate a human neural network. Each of a plurality of network nodes may form a connection relationship so that neurons simulate synaptic activity of neurons that send and receive signals through synapses. In this case, the trained model may be implemented as a VAE model or a GAN model as described above, but this is only an example. The trained model may be implemented as various DNN models.

In addition, the electronic apparatus may user an artificial intelligence agent in order to obtain a modulated user voice as described above. In this case, the artificial intelligence agent is a dedicated program for providing artificial intelligence (AI) based services (e.g., a voice recognition service, a secretary service, a translation service, a search service, etc.), and may be executed by the existing general-purpose processor (e.g., CPU) or a separate AI-only processor (e.g., GPU, etc.). In particular, the artificial intelligence agent may control various modules to be described later.

Specifically, if a predetermined user input is received or a button provided in the electronic apparatus 100 (e.g., a button for executing an artificial intelligence agent) is pressed, the artificial intelligence agent may be operated. In addition, the artificial intelligence agent may obtain a spectrogram corresponding to the second user voice by inputting a spectrogram corresponding to the first user voice to a trained artificial intelligence model.

Of course, when a predetermined user input is received or a button provided in the electronic apparatus 100 (e.g., a button for executing an artificial intelligence agent) is pressed, the artificial intelligence agent may be operated. Alternatively, the artificial intelligence agent may be already executed before a predetermined user input is received or a button provided in the electronic apparatus 100 is selected. In this case, after a predetermined user input is received or a button provided in the electronic apparatus 100 is selected, the artificial intelligence agent of the electronic apparatus 100 may provide a voice modulation function for modulating a user voice to another voice. In addition, the artificial intelligence agent may be in a standby state before a predetermined user input is received or a button provided in the electronic apparatus 100 is selected. Here, the standby state refers to a state for detecting that a predefined user input for controlling the start of the operation of the artificial intelligence agent is received. If a predetermined user input with respect to an object is received or a button provided in the electronic apparatus 100 is selected while the artificial intelligence agent is in the standby state, the electronic apparatus 100 may operate the artificial intelligence agent and provide a voice modulation function for modulating a user voice to another voice.

Meanwhile, the artificial intelligence agent may control various modules which will be described later in detail.

Figure 2:
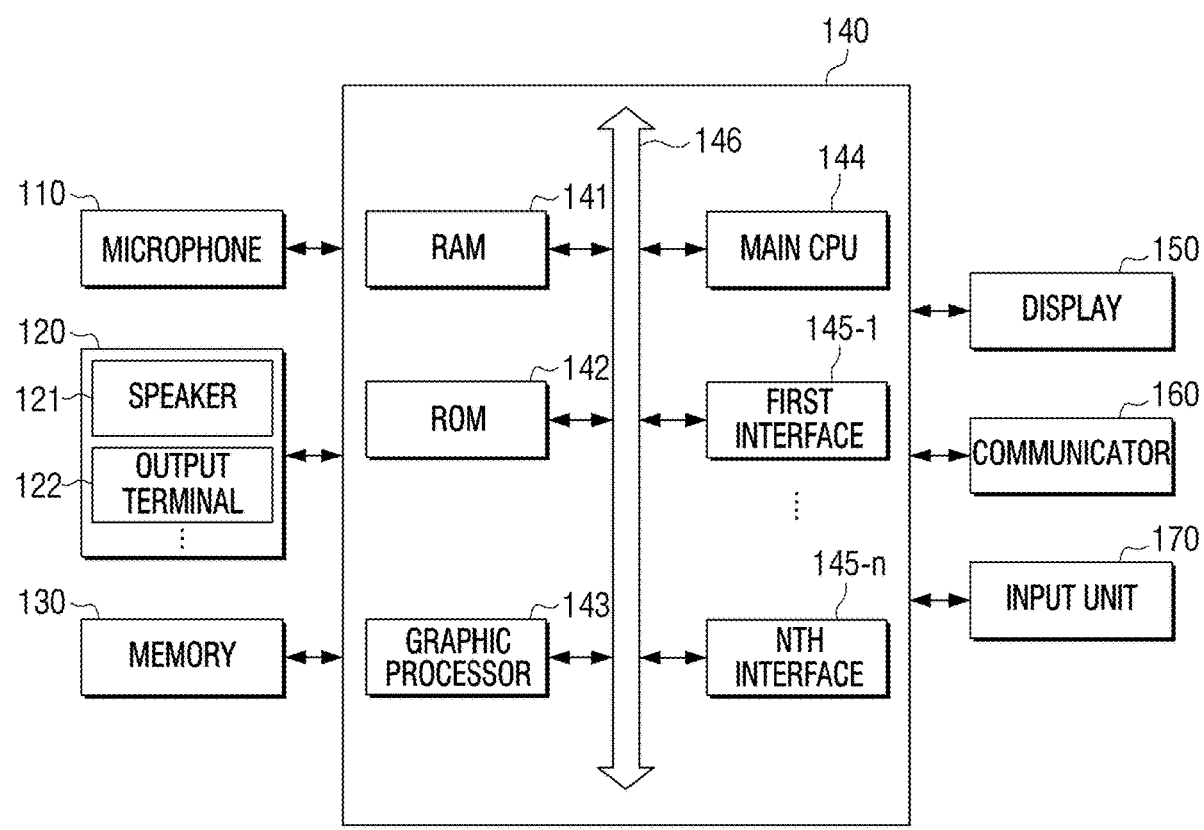
FIG. 2 is a block diagram illustrating configuration of an electronic apparatus in detail according to an embodiment.

FIG. 2 is a block diagram illustrating configuration of an electronic apparatus in detail according to an embodiment. As illustrated in FIG. 2, the electronic apparatus 100 may include the microphone 110, the output unit 120, the memory 130, a display 150, a communicator 160, an input unit 170, and a processor 180. Meanwhile, as the microphone 110, the output unit 120 and the memory 130 have been described with reference to FIG. 1, overlapping description will be omitted.

The output unit 120 is configured to output not only various audio data where various processing operations such as decoding, amplification and noise filtering have been performed by an audio processor (not illustrated) but also various notification sounds and voice messages. In particular, the output unit 120 may include a speaker 121 and an output terminal 122 that outputs voice data to an external device as illustrated in FIG. 2.

The display 150 may provide various screens. In particular, the display 150 may display various UIs. For example, the display 150 may display a UI for selecting a voice that a user wishes to modulate from among a plurality of voices.

The communicator 160 may perform communication with various types of external devices according to various types of communication methods. The communicator 120 may include at least one of a WiFi chip, a Bluetooth chip and a wireless communication chip. The processor 140 may perform communication with an external device (e.g., a server including an artificial intelligence model, etc.) using the communicator 160. In addition, the communicator 160 may perform communication with an external device through various communication chips such as an NFC chip, etc.

In particular, the communicator 160 may transmit a spectrogram corresponding to the first user voice or the first user voice to an external server. In addition, the communicator 160 may receive a spectrogram corresponding to the second user voice or the second user voice from the external server.

The input unit 170 may receive various user inputs and transmit the user inputs to the processor 140. In particular, the input unit 130 may include a touch sensor, a (digital) pen sensor, a pressure sensor, a key, or a microphone. The touch sensor may user at least one of, for example, a capacitive type, a resistive type, an infrared type, or an ultrasonic type. The (digital) pen sensor may be, for example, part of a touch panel or include a separate sheet for recognition. The key may include, for example, a physical button, an optical key or a keypad. The microphone is configured to receive a user voice, and may be provided inside the electronic apparatus 100. However, this is only an example, and the microphone may be provided outside the electronic apparatus 100 and be electrically connected to the electronic apparatus 100.

In particular, the input unit 170 may receive a user input of selecting a voice that a user wishes to modulate from among a plurality of voices.

The processor 140 (or a controller) may control the overall operations of the electronic apparatus 100 using various programs stored in the memory 130.

The processor 140 may consist of a RAM 141, a ROM 142, a graphic processor 143, a main CPU 144, first to nth interfaces 145-1~145-n, and a bus 146. Here, the RAM 141, the ROM 142, the graphic processor 143, the main CPU 144, the first to nth interfaces 145-1~145-n, etc. can be connected to each other through the bus 146.

FIG. 3 is a block diagram illustrating configuration for modulating a user voice according to various embodiments. As illustrated in FIG. 3, the electronic apparatus may include a user voice input unit 310, a spectrogram conversion unit 320, an artificial intelligence learning model 330, a voice conversion unit 340, and a converted voice output unit 350.

The user voice input unit 310 may receive a voice of the first user through the microphone 110. In this case, the first user voice may be a voice of a user who uses an electronic apparatus directly.

The spectrogram conversion unit 320 may convert a voice of the first user input through the user voice input unit 310 to the first spectrogram. In this case, the spectrogram conversion unit 320 may convert a voice of the first user to a spectrogram using discrete wavelet transform (DWT), but this is only an example. The spectrogram conversion unit 320 may convert a user voice into a spectrogram in various ways.

The artificial intelligence learning model 330 may be a model trained to obtain the second spectrogram corresponding to the second user voice using the first spectrogram corresponding to the first user voice as input data. In this case, the second user voice may be a user voice that the user wishes to modulate. In particular, the artificial intelligence learning model 330 may be trained to obtain a spectrogram corresponding to the second user voice. In other words, when changing one of a plurality of user voices, the second spectrogram corresponding to the second user voice may be obtained based on an artificial intelligence learning model corresponding to a user voice selected by a user from among a plurality of artificial intelligence learning models.

In particular, the artificial intelligence learning model 330 may obtain a spectrogram corresponding to the second user voice by using a spectrogram corresponding to the first user voice as input data. In this case, the artificial intelligence learning model 330 is a model for converting a spectrogram into a spectrogram having a voice style of another user, and a VAE model or a GAN model may be used. However, this is only an example, and another model may be used.

The voice conversion unit 340 may convert the second spectrogram obtained through the artificial intelligence model 330 into the second user voice. In this case, the voice conversion unit 340 may convert the spectrogram obtained from the artificial intelligence learning model 330 into the second user voice using a Griffi-Lim algorithm, but this is only an example. The voice conversion unit 340 may convert a spectrogram to another user voice using another algorithm.

The converted voice output unit 350 may output the second user voice converted by the voice conversion unit 340 through the speaker 121 or the output terminal 122.

Figure 4:
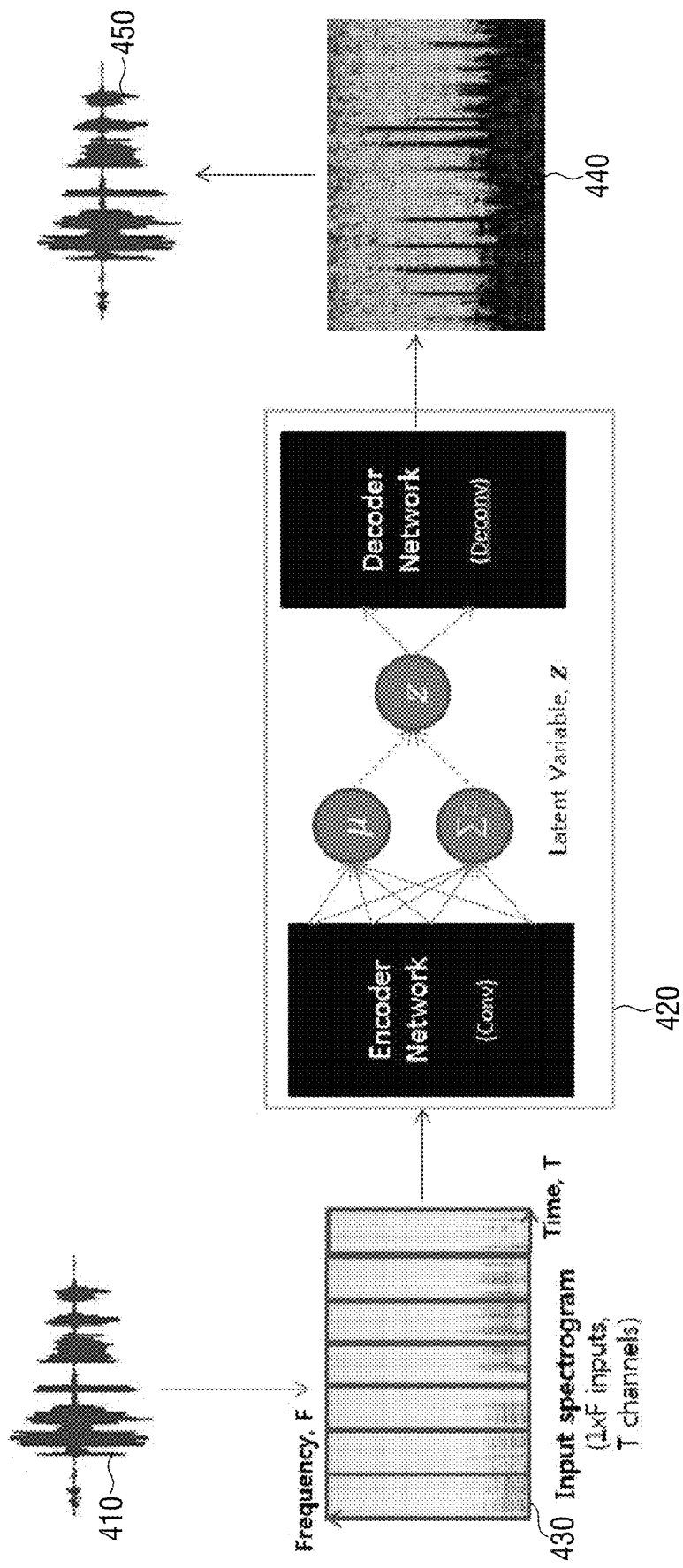
FIG. 4 is a view provided to explain an example for modulating a user voice using a VAE model according to an embodiment.

FIG. 4 is a view provided to explain an example for modulating a user voice using a VAE model according to an embodiment. Here, the VAE model may include at least one encoder network and at least one decoder network trained to obtain a spectrogram corresponding to the second user voice using a spectrogram corresponding to the first user voice as input data. In this case, the VAE model may obtain information (e.g., average, variance, etc.) regarding a latent variable (Z) for conversion to the second user voice through learning.

Firstly, a first user voice 410 may be input. In this case, the first user voice 410 may be a user voice having the voice style of the user who uses the electronic apparatus 100.

The first user voice 410 may be converted to a first spectrogram 420 by DWT. Here, the first spectrogram 420 may be an image representing a change in frequency of the user voice over time.

In this case, the first spectrogram 420 may be used as input data to a VAE model 430. In particular, the first spectrogram may include an input value corresponding to a frequency and the number of channels corresponding to time among spectrograms.

The VAE model 430 may obtain a second spectrogram 440 using the first spectrogram 420 as input data. In this case, the VAE model 430 may include an encoder network and a decoder network.

The encoder network may include a plurality of convolutional layers. In particular, the encoder network may obtain the mean ($\mu$) of the latent variable (z) and the variance ($\Sigma$) of the latent variable (z) by inputting the first spectrogram 420 which is input data to the plurality of convolutional layers. Here, the latent variable (z) may be in the form of a Gaussian function having characteristics corresponding to the second user voice.

The decoder network may include a plurality of de-convolutional layers. In particular, the decoder network may obtain a second spectrogram 440 corresponding to the second voice by inputting the latent variable (z) to the plurality of de-convolutional layers.

In particular, data which is two-dimensional such as an image and where one pixel has strong correlation with surrounding pixels may be used as input data of a CNN network structure. Even in the case of the spectrogram, one pixel has strong correlation with surrounding pixels such as an image, an encoder network and a decoder network may apply CNN. In other words, it is possible to obtain a characteristic regarding local correlation of a spectrogram corresponding to a user voice, and obtain a latent variable for voice modulation based on the obtained local correlation.

The second spectrogram 440 may have the voice style of the second user. In addition, the second spectrogram 440 may be converted to a second user voice 450 through a Griffi-Lim algorithm.

The second user voice 450 may be output to the outside through the speaker 121 or the output terminal 122.

Figure 5A:
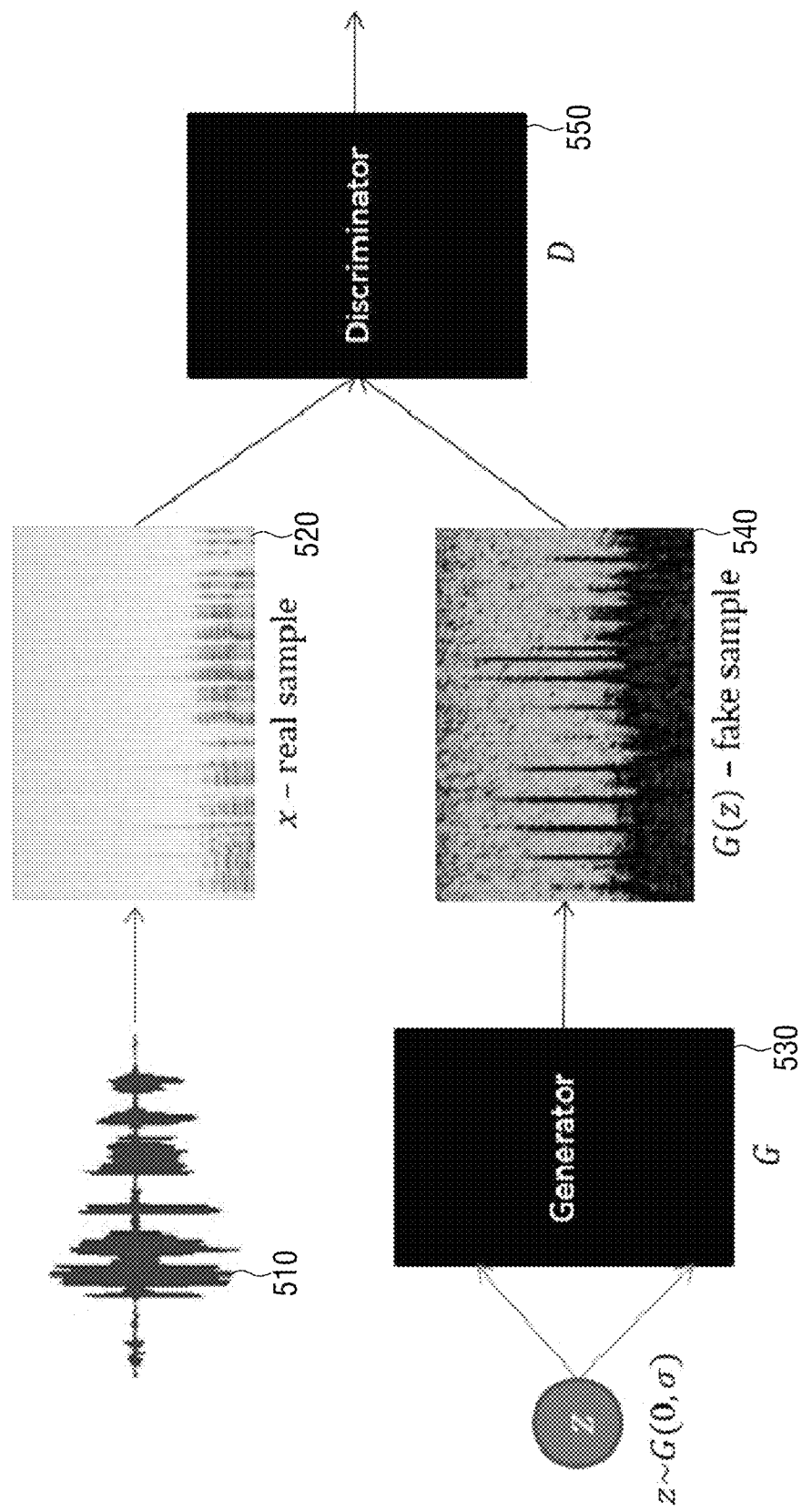
FIG. 5A is a view provided to explain an example for learning a GAN model for modulating a user voice according to an embodiment.

FIG. 5A is a view provided to explain an example for learning a GAN model for modulating a user voice according to an embodiment.

Specifically, a first user voice 510 may be converted into a first spectrogram sample 520. Here, the first user voice 510 may be converted into the first spectrogram sample 520 by DWT.

A generator 520 may obtain a fake second spectrogram sample 540 corresponding to the second user voice based on input data (z) corresponding to the first user voice.

A discriminator 550 may determine whether the first spectrogram sample 520 corresponding to the first user voice matches the fake second spectrogram sample 540 corresponding to the second user voice.

If it is determined that the first spectrogram sample 520 corresponding to the first user voice and the fake second spectrogram sample 540 corresponding to the second user voice do not match, the electronic apparatus 100 may change a network included in the generator 530.

By performing the above process repeatedly, the electronic apparatus 100 may obtain the generator 530 capable of generating the fake second spectrogram sample 540 corresponding to the second user voice, which matches the first spectrogram sample 520.

Figure 5B:
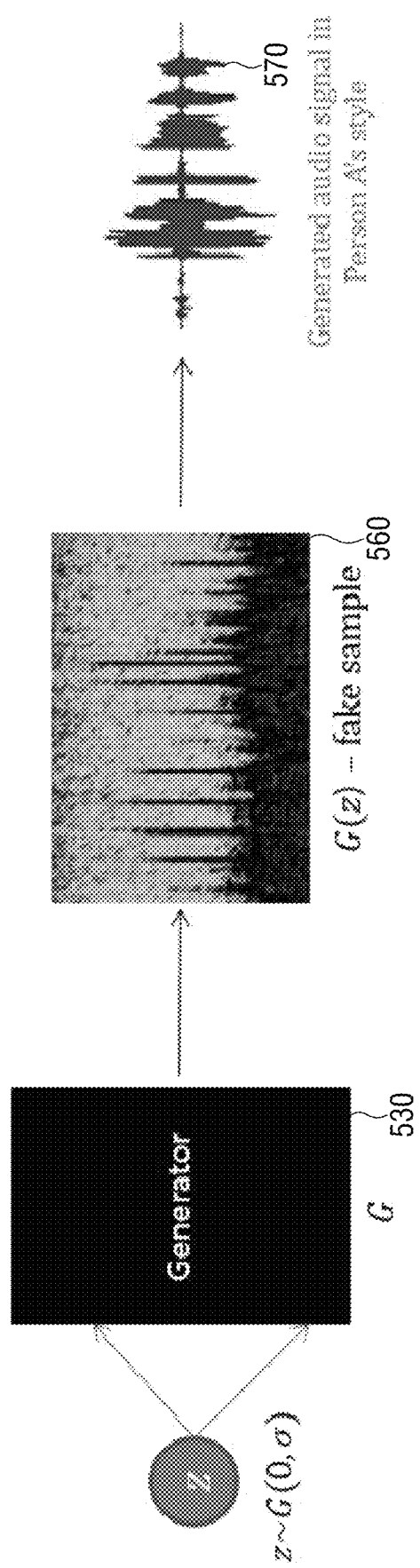
FIG. 5B is a view provided to explain an example for modulating a user voice using a GAN model according to an embodiment.

FIG. 5B is a view provided to explain an example for modulating a user voice using a GAN model according to an embodiment.

The electronic apparatus 100 may generate a second spectrogram 560 corresponding to the second user voice matching the first user voice 510 by inputting input data (z) corresponding to the input first user voice to the generator 530 in the same method as FIG. 5A.

The second spectrogram 560 may be converted into a second user voice 570 through a Griffi-Lim algorithm.

Meanwhile, in FIGS. 4, 5A and 5B, a VAE model or a GAN model have been described, but this is only an example. An image corresponding to a user voice may be converted into an image corresponding to another user voice using different artificial intelligence models.

Figure 6:
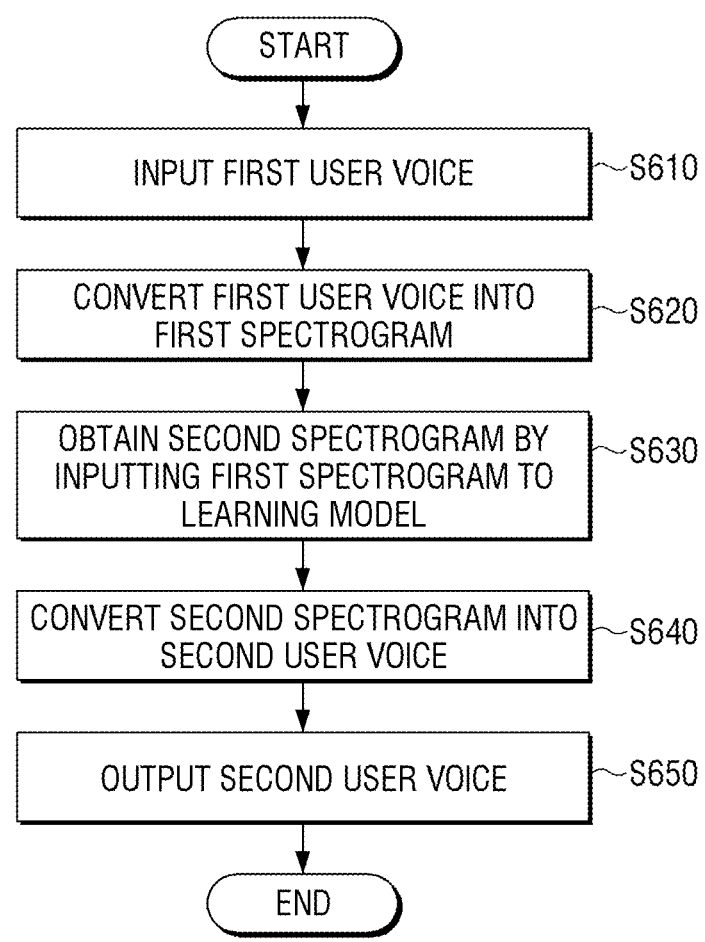
FIG. 6 is a flowchart provided to explain a controlling method of an electronic apparatus according to an embodiment.

FIG. 6 is a flowchart provided to explain a controlling method of an electronic apparatus according to an embodiment.

Firstly, the electronic apparatus 100 may receive a first user voice (S610).

The electronic apparatus 100 may convert the first user voice into a first spectrogram (S620). Specifically, the electronic apparatus 100 may convert the first user voice into a spectrogram using DWT.

The electronic apparatus 100 may obtain a second spectrogram by inputting the first spectrogram to an artificial intelligence learning model (S630). Specifically, the electronic apparatus 100 may obtain a spectrogram corresponding to a second user voice by inputting the first spectrogram to a trained artificial intelligence model as input data. Here, the trained artificial intelligence model may be a VAE model or a GAN model, but this is only an example. The trained artificial intelligence model may be implemented as another model capable of generating a new image using an arbitrary image.

The electronic apparatus 100 may convert the second spectrogram into the second user voice (S640). Specifically, the electronic apparatus 100 may convert the second spectrogram into the second user voice using a Griffi-Lim algorithm.

The electronic apparatus 100 may output the second user voice (S650).

Meanwhile, in the above-described embodiment, the first user voice input to the microphone 110 directly by the first user is converted into the second user voice, but this is only an example. A voice input from an external device or a server may be converted into the second user voice.

In addition, if text data is output as a voice, the electronic apparatus 100 may convert the text data into the first user voice, and convert the converted first user voice into the second user voice using an artificial intelligence model as described above. In other words, the electronic apparatus 100 may convert the text data into the second user voice and output the same.

In the above-described embodiment, voice conversion is performed using a spectrogram, but this is only an example. Another image corresponding to a user voice may be used to perform voice conversion. In other words, voice conversion may be performed by inputting the first image corresponding to the first user voice to a trained artificial intelligence model and obtaining the second image corresponding to the second user voice.

Figure 7:
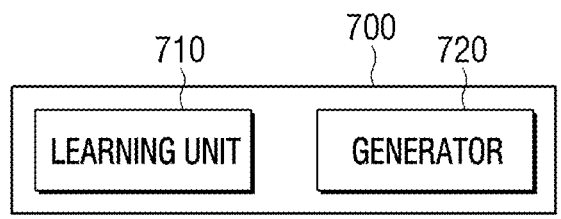
FIG. 7 is a block diagram illustrating configuration of an electronic apparatus for learning and using an artificial intelligence model according to an embodiment.

FIG. 7 is a block diagram illustrating configuration of an electronic apparatus for learning and using an artificial intelligence model according to an embodiment.

Referring to FIG. 7, a processor 700 may include at least one of a learning unit 710 and a generator 720. The processor 700 in FIG. 13 may correspond to the processor 140 of the electronic apparatus or a processor of a server (not illustrated) that stores an artificial intelligence model.

The learning unit 710 may generate or train a model for obtaining other images using learning data. The learning unit 710 may generate a trained model having a generation criterion using collected learning data.

For example, the learning unit 710 may generate, train or update a model for obtaining the second image corresponding to the second user voice using the first image (e.g., a spectrogram) corresponding to the first user voice as input data. Here, the model may be implemented as a VAE model or a GAN model, but this is only an example. The model may be implemented as another model.

In addition, the learning unit 710 may generate, train or update each of a plurality of learning models corresponding to a plurality of voices.

The generator 720 may obtain another image by using a predetermined image as input data of a trained model. For example, the generator 720 may obtain (or generate) the second image by using the first image as input data of a trained model.

At least part of the learning unit 710 and at least part of the generator 720 may be implemented as a software module, manufactured in the form of a hardware chip and mounted on an electronic apparatus. For example, at least one of the learning unit 710 or the generator 720 may be manufactured in the form of a dedicated hardware chip for an artificial intelligence (AI), or may be manufactured as part of the existing general-purpose processor (e.g., a CPU or an application processor) or a graphic-only processor (e.g., a GPU) and mounted on various electronic apparatuses described above. In this case, the dedicated hardware chip for artificial intelligence is a dedicated processor specialized in probability calculation, and may process operational tasks in the field of artificial intelligence such as machine learning rapidly as it has higher parallel processing performance than the existing general-purpose processor. If the learning unit 710 and the generator 720 are implemented as a software module (or a program module including instructions), the software module may be stored in a non-transitory computer readable media that is readable by a computer. In this case, the software module may be provided by an Operating System (OS) or a predetermined application. Alternatively, some of the software modules may be provided by an OS and the other may be provided by a predetermined application.

In this case, the learning unit 710 and the generator 720 may be mounted on one electronic apparatus or may be mounted on separate electronic apparatuses, respectively. For example, one of the learning unit 710 and the generator 720 may be included in one electronic apparatus 100, and the other may be included in an external server. In addition, the learning unit 710 and the generator 720 may provide model information established by the learning unit 710 to the generator 720 via wire or wirelessly, and the data input to the generator 720 may be provided to the learning unit 710 as additional learning data.

Figure 8A:
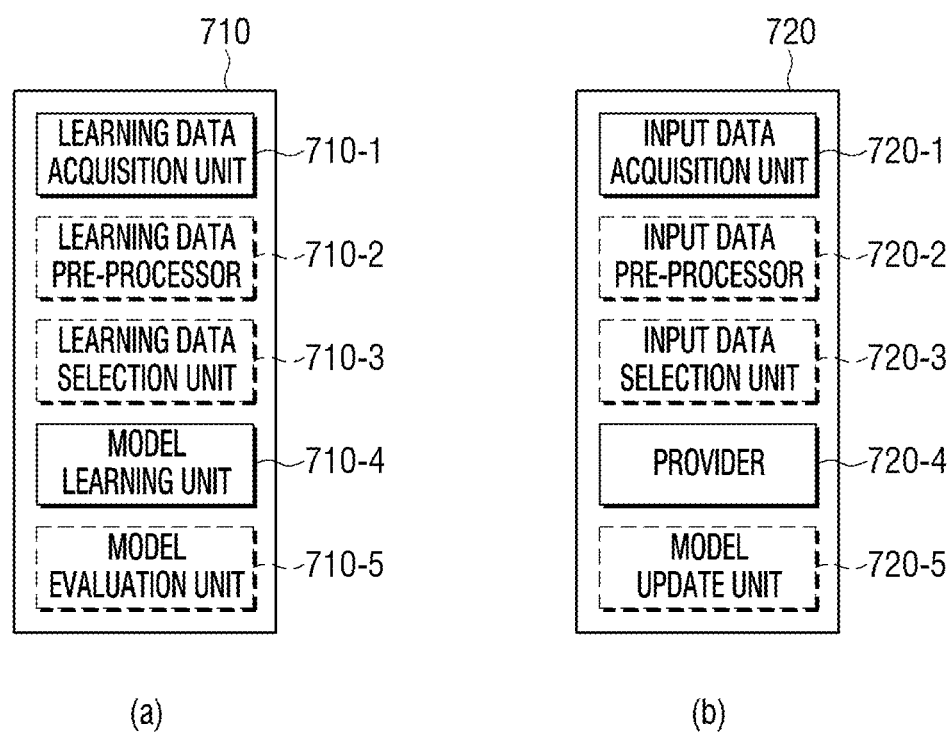
FIGS. 8A and 8B are block diagrams illustrating specific configuration and a learning unit and a generator according to an embodiment.

FIG. 8A is a block diagram of the learning unit 710 and the generator 720 according to various embodiments.

Referring to (a) of FIG. 8A, the learning unit 710 according to some embodiments may include a learning data acquisition unit 710-1 and a model learning unit 710-4. In addition, the learning unit 710 may further include at least one of a learning data pre-processor 710-2, a learning data selection unit 710-3 and a model evaluation unit 710-5 selectively.

The learning data acquisition unit 710-1 may acquire learning data required for an artificial intelligence model. According to an embodiment, the learning data acquisition unit 1310-1 may acquire the first image corresponding to the first user voice as learning data. The learning data may be data collected or tested by the learning unit 710 or a manufacturer of the learning unit 710.

The model learning unit 710-4 may train an artificial intelligence model to have a criterion on how to generate a new image using learning data. For example, the model learning unit 710-4 may train an artificial intelligence model through a supervised learning that uses at least part of the learning data as a criterion for determination. Alternatively, the model learning unit 710-4 may train an artificial intelligence model through unsupervised learning that discovers a criterion for determination for determining a situation by learning by itself using learning data without any particular supervision. The model learning unit 710-4 may, for example, train an artificial intelligence model through reinforcement learning that uses a feedback on whether a result of determination regarding a situation according to learning is correct. In addition, the model learning unit 710-4 may train an artificial intelligence model using a learning algorithm including, for example, error back-propagation or gradient descent.

If there are a plurality of pre-established artificial intelligence models, the model learning unit 710-4 may determine an artificial intelligence with greater relevance to input learning data and basic learning data as an artificial intelligence model to be trained. In this case, the basic learning data may be pre-classified for each data type, and the artificial intelligence models may be pre-established for each data type. For example, the basic learning data may be pre-classified based on various criteria such as the region where the learning data is generated, the time when the learning data is generated, the size of the learning data, the genre of the learning data, the generator of the learning data, the type of object in the learning data, etc.

Once an artificial intelligence model is trained, the model learning unit 710-4 may store the trained artificial intelligence model. In this case, the model learning unit 710-4 may store the trained artificial intelligence model in the memory 130 of the electronic apparatus 100. Alternatively, the model learning unit 710-4 may store the trained artificial intelligence model in a server (e.g., the memory of an external server) connected to the electronic apparatus 100 via wire or wirelessly.

The learning unit 710 may further include the data pre-processor 710-2 and the learning data selection unit 710-3 in order to improve a recognition result of an artificial intelligence model or save resources or time required for generating an artificial intelligence mode.

The learning data pre-processor 710-2 may pre-process acquired data so that the acquired data can be used for learning for generating a new image. The learning data pre-processor 710-2 may process the acquired data in a predetermined format so that the model learning unit 710-4 can use the acquired data for learning for generating a new image. For example, the learning data pre-processor 710-2 may convert an input user voice to a spectrogram image.

The learning data selection unit 710-3 may select data required for learning from data acquired by the learning data acquisition unit 710-1 or data pre-processed by the learning data pre-processor 710-2. The selected learning data may be provided to the model learning unit 710-4. The learning data selection unit 710-3 may select learning data required for learning from acquired or pre-processed data according to a predetermined selection criterion. In addition, the learning data selection unit 710-3 may select learning data according to a selection criterion predetermined by learning of the model learning unit 710-4.

The learning unit 710 may further include the model evaluation unit 710-5 to improve a recognition result of an artificial intelligence model.

The model evaluation unit 710-5 may input evaluation data to an artificial intelligence model, and if a recognition result output from the evaluation data does not satisfy a predetermined criterion, may let the model learning unit 710-4 learn again. In this case, the evaluation data may be predefined data for evaluating an artificial intelligence model.

For example, if the number or ratio of evaluation data where a recognition result is not accurate from among recognition results of a trained artificial intelligence model regarding evaluation data exceeds a predetermined threshold value, the model evaluation unit 710-5 may evaluate that a predetermined criterion is not satisfied.

Meanwhile, if there are a plurality of trained artificial intelligence models, the model evaluation unit 710-5 may evaluate whether each of the trained artificial intelligence models satisfies a predetermined criterion, and determine a model that satisfies the predetermined criterion as a final artificial intelligence model. In this case, if there are a plurality of models that satisfy the predetermined criterion, the model evaluation unit 710-5 may determine a predetermined one model or the predetermined number of models in order of highest evaluation score as the final artificial intelligence model(s).

Referring to (b) of FIG. 7A, the generator 720 according to some embodiments may include an input data acquisition unit 720-1 and a provider 720-4.

In addition, the generator 720 may further include at least one of an input data pre-processor 720-2, an input data selection unit 720-3 and a model update unit 720-5 selectively.

The input data acquisition unit 720-1 may acquire data (e.g., a user voice, an image corresponding to a user voice, etc.) required to generate a new image. The provider 720-4 may acquire a new image by applying input data acquired by the input data acquisition unit 720-1 to a trained artificial intelligence model as an input value. The provider 720-4 may acquire a recognition result by applying data selected by the input data pre-processor 720-2 or the input data selection unit 720-3 which will be described later to an artificial intelligence model as an input value. The recognition result may be determined by the artificial intelligence model.

According to an embodiment, the provider 720-4 may generate (or infer) the second image by applying the first energy acquired by the input data acquisition unit 720-1 to a trained artificial intelligence model.

The generator 720 may further include the input data pre-processor 720-2 and the input data selection unit 720-3 to improve a generation result (or a conversion result) of an artificial intelligence model or save resources or time for providing a generated image.

The input data pre-processor 720-2 may pre-process acquired data so that the acquired data can be used to be inputted to a trained artificial intelligence model. The input data pre-processor 720-2 may process acquired data in a predefined format so that the provider 720-4 can use the acquired data can be used for object recognition and acquisition of description information.

The input data selection unit 720-3 may select data required for determination of situation from the data acquired by the input data acquisition unit 720-1 and the data pre-processed by the input data pre-processor 720-2. The selected data may be provided to the provider 720-4. The input data selection unit 720-3 may select some or all of the acquired or pre-processed data according to a predetermined selection criterion. In addition, the input data selection unit 720-3 may select data according to a predetermined selection criterion by learning of the model learning unit 710-4.

The model update unit 720-5 may control to update an artificial intelligence model based on evaluation regarding a recognition result provided by the provider 720-4. For example, the model update unit 720-5 may request the model learning unit 710-4 to additionally learn or update an artificial intelligence model by providing a recognition result provided by the provider 720-4 to the model learning unit 710-4.

Figure 8B:
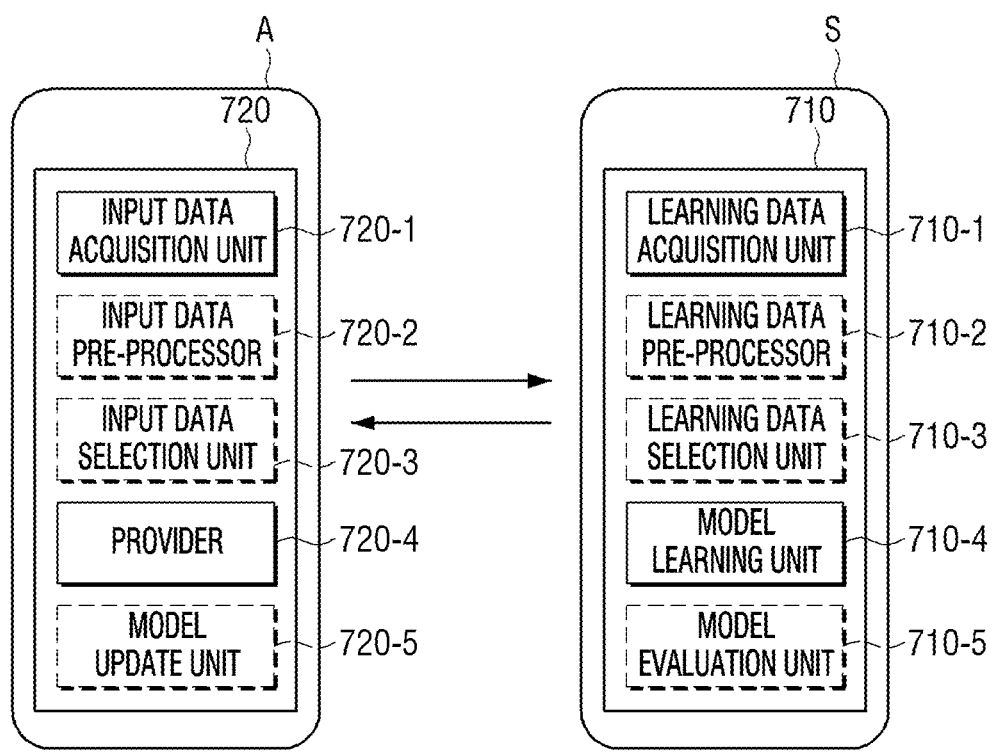

FIG. 8B is a view illustrating an example of learning and determining as the electronic apparatus 100 and an external server S are interlocking with each other.

Referring to FIG. 8B, the external server S may learn a criterion for generating a new second image from a first image, and the electronic apparatus 100 may obtain a new image using an artificial intelligence model that is generated based on a learning result by the server S.

In this case, the model learning unit 710-4 of the server S may perform the function of the learning unit 710 illustrated in FIG. 7. The model learning unit 710-4 of the server S may learn an image generation criterion (or an image conversion criterion) of an artificial intelligence model.

In addition, the provider 720-4 of the electronic apparatus 100 may obtain an image corresponding to the voice of another person by applying data selected by the input data selection unit 720-3 to an artificial intelligence model generated by the server S. Alternatively, the provider 720-4 of the electronic apparatus 100 may receive an artificial intelligence model generated by the server S, and generate an image corresponding to the voice of another person using the received artificial intelligence model.

Figure 9:
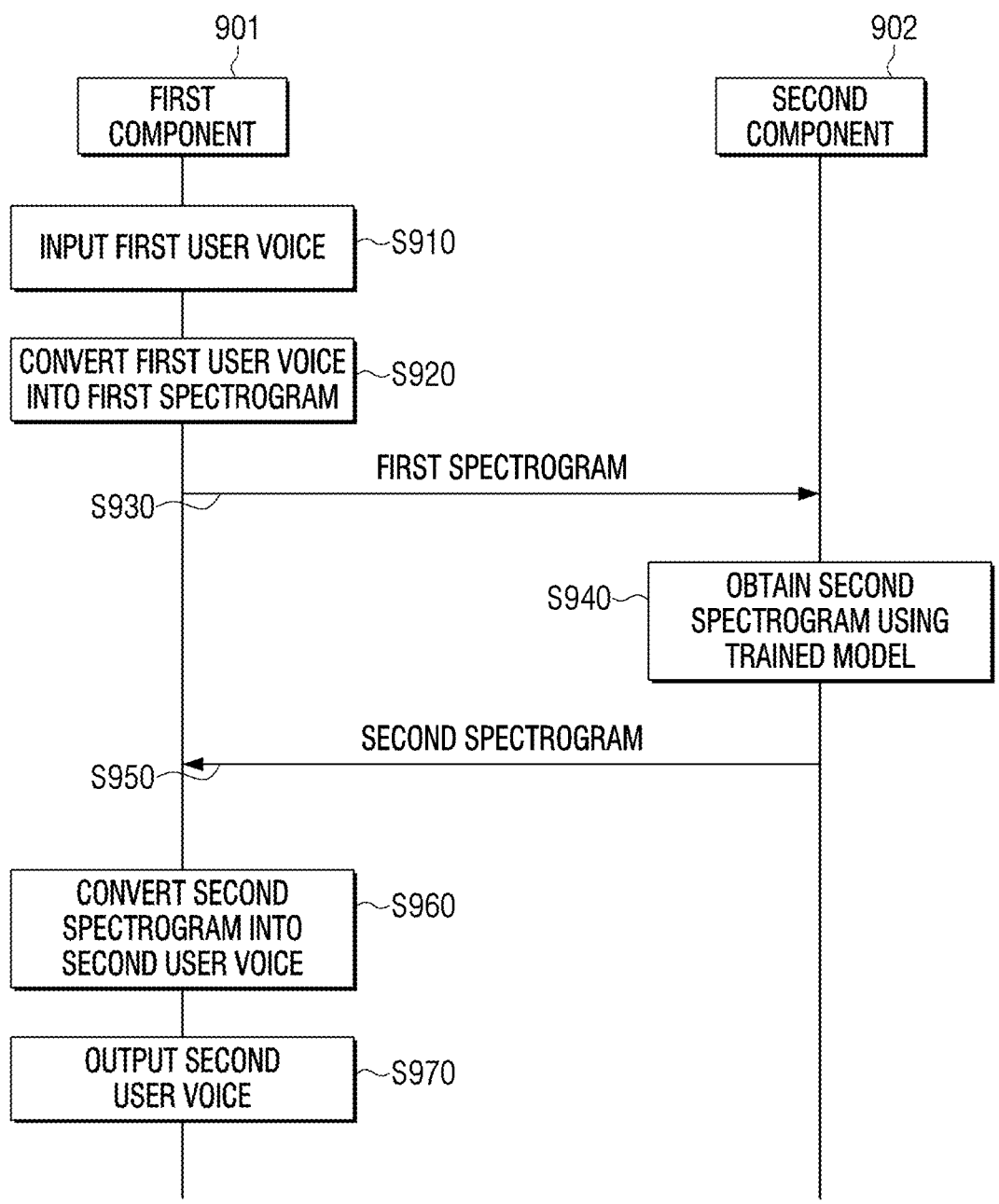
FIG. 9 is a flowchart of a network system using a trained model according to an embodiment.

FIG. 9 is a flowchart of a network system using a trained model according to an embodiment. In FIG. 9, a network system using a trained artificial intelligence model may include a first component 901 and a second component 902.

Here, the first component 901 may be an electronic apparatus (A), and the second component may be a server S stored in an artificial intelligence model. Alternatively, the first component 901 may be a general-purpose processor, and the second component 902 may be a dedicated processor for artificial intelligence. Also, the first component 901 may be an at least one application, and the second component 902 may be an operating system (OS). In other words, the second component 902 is a component that is more integrated, dedicated, has a small delay, has superior performance or has many resources, and may be a component capable of processing many operations required for generating, updating or applying a data recognition model more rapidly and effectively than the first component 901.

In this case, an interface for transmitting/receiving data between the first component 901 and the second component 902 may be defined.

For example, an application program interface (API) having learning data to be applied to a recognition model as a factor value (or an intermediary value or a transfer value) may be defined. The API may be defined as a group of subroutines or functions that can be called for any processing of one protocol (e.g., a protocol defined in the electronic apparatus A) to another protocol (a protocol defined in the server S). In other words, an environmental where an operation of one protocol to another protocol can be performed through the API may be provided.

In FIG. 9, the first component 901 may receive a first user voice (S910). Here, the first user voice may be the voice of a user who uses the electronic apparatus 100.

The first component 901 may convert the first user voice to a first spectrogram (S920).

The first component 901 may transmit the converted first spectrogram to the second component 901 (S930).

The second component 902 may obtain a second spectrogram using a trained model (S940). Here, the trained model is a model trained to obtain a spectrogram of the second user voice style by inputting a spectrogram of the first user voice style, and may obtain the second spectrogram by inputting the first spectrogram to a trained model.

The second component 902 may transmit the second spectrogram to the first component 901 (S950).

The first component 901 may convert the second spectrogram to the second user voice (S960). Specifically, the first component 901 may convert the spectrogram to the second user voice using a Griffin-Lim algorithm.

The first component 901 may output the converted second user voice.

Meanwhile, in FIG. 9, it is described that the first component 901 converts the first user voice into the first spectrogram, and converts the second spectrogram into the second user voice, but this is only an example. The second component 902 may convert the first user voice into the first spectrogram, and convert the second spectrogram into the second user voice. In this case, the first component 901 may transmit the first user voice to the second component 902, and receive the second user voice from the second component 902.

The term "module" or "unit" used in the disclosure includes a unit configured with hardware, software, or firmware, and may be interchangeably used with a term such as logic, logic block, part, or circuit. A module may be an integrated part, a minimum unit to perform one or more functions, or a part thereof. For example, a module may be configured with an application-specific integrated circuit (ASIC).

The above-described various embodiments may be implemented as software including one or more instructions stored in a storage medium which can be read by machine (e.g., a computer). The machine may call instructions from the storage medium and perform operations according to the instructions, and may include the electronic apparatus 100 according to embodiments. When an instruction is executed under the control of the processor, the processor directly or using other components under the control of the processor may perform a function corresponding to the instruction. The instructions may include a code generated or executed by a complier or an interpreter. The storage medium which can be read by machine may be provided in the form of a non-transitory storage medium. Here, 'non-transitory' merely means that the storage medium is a tangible device and does not include a signal, and this term is not used to distinguish a case where data is stored in the storage medium semi-permanently and a case where data is stored temporarily.

According to an embodiment, a method according to the various embodiments may be included in a computer program product and provided therein. The computer program product can be traded between a seller and a buyer as a product. The computer program product may be distributed in the form of a storage medium that can be read by machine (e.g., compact disc read only memory (CD-ROM)), or may be distributed online through an application store (e.g., PlayStore™). In the case of online distribution, at least a portion of the computer program product may be at least temporarily stored in a storage medium such as a memory of a server of a manufacturer, a server of an application store, or a relay server, or may be temporarily generated.

Each of the components according to the aforementioned various embodiments (e.g.: a module or a program) may consist of a singular object or a plurality of objects. In addition, among the aforementioned corresponding sub components, some sub components may be omitted, or other sub components may be further included in the various embodiments. Alternatively or additionally, some components (e.g.: a module or a program) may be integrated as an object, and perform the functions that were performed by each of the components before integration identically or in a similar manner Operations performed by a module, a program, or other components according to the various embodiments may be executed sequentially, in parallel, repetitively, or heuristically. Or, at least some of the operations may be executed in a different order, or omitted, or other operations may be added.

What is claimed is:

1. A controlling method of an electronic apparatus, the method comprising:
obtaining a first user voice of a first user;
converting the first user voice into a first spectrogram using discrete wavelet transform (DWT);
obtaining a second spectrogram by inputting the first spectrogram to a trained model through an artificial intelligence algorithm;
converting the second spectrogram into a second user voice of a second user using a Griffin-Lim algorithm; and
outputting the converted second user voice,
wherein the trained model is a Variational Auto-encoder (VAE) model trained to obtain a spectrogram of a style of the second user voice by inputting a spectrogram of a style of the first user voice, and
wherein the VAE model includes:
an encoder network for obtaining a latent variable from the first spectrogram, and
a decoder network for obtaining the second spectrogram corresponding to the second user voice from the obtained latent variable.

2. The method of claim 1, wherein data input to the trained model includes:
an input value corresponding to a frequency from the first spectrogram; and
a number of channels corresponding to a time from the first spectrogram.

3. The method of claim 1, wherein the trained model is a Generative Adversarial Networks (GAN) model.

4. The method of claim 3, wherein the GAN model is trained using:
a generator for obtaining the second spectrogram corresponding to the second user voice from the first spectrogram; and
a discriminator for determining whether the second spectrogram corresponding to the second user voice is a real image.

5. The method of claim 1, wherein the trained model comprises a plurality of trained models, and each of the plurality of trained models is trained to obtain an image of a corresponding user voice style.

6. An electronic apparatus, comprising:
a microphone;
an output unit;
a memory including at least one command; and
a processor configured to be connected to the output unit and the memory and control the electronic apparatus,
wherein the processor is further configured to:
obtain a first user voice of a first user through the microphone by executing the at least one command,
convert the first user voice into a first spectrogram using discrete wavelet transform (DWT),
obtain a second spectrogram by inputting the first spectrogram into a model trained through an artificial intelligence algorithm,
convert the second spectrogram into a second user voice of a second user using a Griffin-Lim algorithm, and
control the output unit to output the converted second user voice,
wherein the trained model is a Variational Auto-encoder (VAE) model trained to obtain a spectrogram of a style of the second user voice by inputting a spectrogram of a style of the first user voice, and
wherein the VAE model includes:
an encoder network for obtaining a latent variable from the first spectrogram, and
a decoder network for obtaining the second spectrogram corresponding to the second user voice from the obtained latent variable.

7. The apparatus of claim 6, wherein data input to the trained model includes:
an input value corresponding to a frequency from the first spectrogram; and
a number of channels corresponding to a time from the first spectrogram.

8. The apparatus of claim 6, wherein the trained model is a Generative Adversarial Networks (GAN) model.

9. The apparatus of claim 8, wherein the GAN model is trained using:
a generator for obtaining the second spectrogram corresponding to the second user voice from the first spectrogram; and
a discriminator for determining whether the second spectrogram corresponding to the second user voice is a real image.

* * * * *